Figure 1:
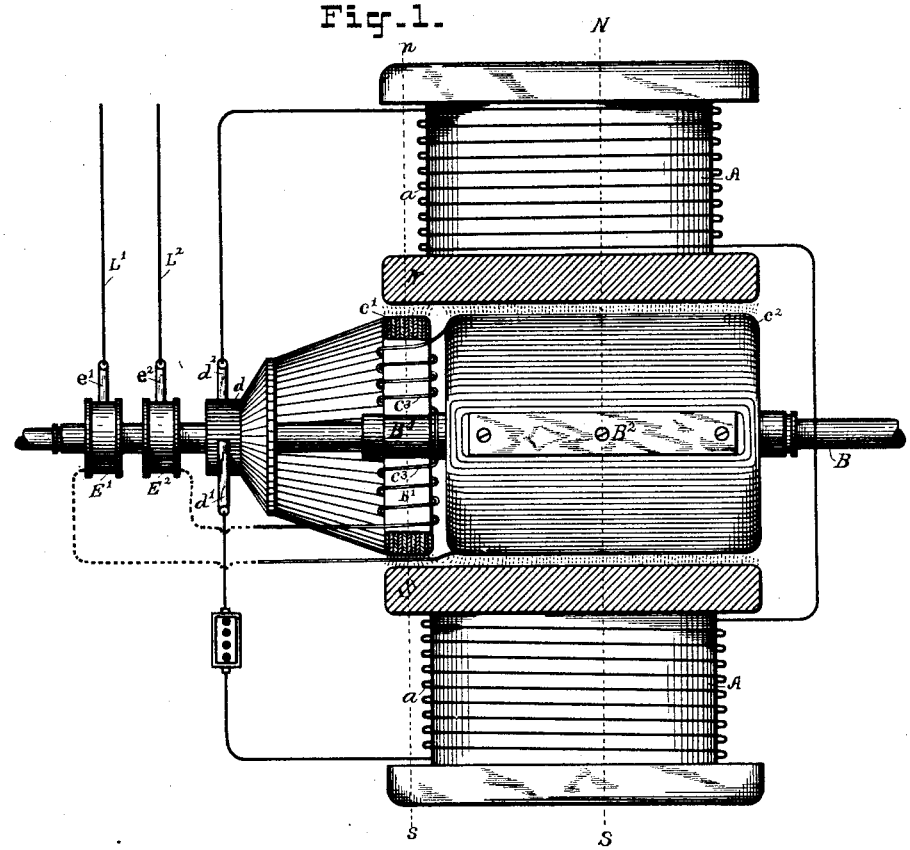

(No Model.)

O. B. SHALLENBERGER.
COMPENSATING ALTERNATING CURRENT DYNAMO.

No. 476,830.  Patented June 14, 1892.

WITNESSES:
George Brown Jr.
Hubert C. Tener.

INVENTOR,
OLIVER. B. SHALLENBERGER.
by Charles A. Terry
Att'y.

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

COMPENSATING ALTERNATING-CURRENT DYNAMO.

SPECIFICATION forming part of Letters Patent No. 476,830, dated June 14, 1892.

Application filed February 13, 1889. Serial No. 299,693. (No model.)

*To all whom it may concern:*

Be it known that I, OLIVER B. SHALLENBERGER, a citizen of the United States, residing in Rochester, in the county of Beaver and State of Pennsylvania, have invented a new and useful Improvement in Compensating Alternate-Current Dynamos, (Case No. 286,) of which the following is a specification.

The invention relates to the class of electric generators in which the field of force for the armature is maintained by means of currents, which may be generated either in the machine itself or obtained from a separate source.

The special objects of the invention are to provide a simple and efficient method of obtaining the proper field of force for such generators, whether designed to deliver continuous or alternating electric currents to a work-circuit, and to secure such variation or regulation on the part of the field of force as may be required by reason of the variations in the current delivered to the work-circuit. In some instances it may be required that the electro-motive force of the generator shall remain approximately constant, notwithstanding variations which may take place in the amount of work being done. In other instances it may be desired that the difference of potential at the terminals of the machine should vary, according to some determinate law relative to the increase of current, in order to compensate for an increased drop or load upon the circuit due to the transmission of the increased current. The invention has therefore this further object of compensating for such varying difference of potential whenever occasion shall require.

The general plan of carrying the invention into practice is as follows: Two armatures are placed side by side upon an armature-shaft and they revolve in the field of force established by a field-magnet common to both. The terminals of one of the armatures are connected with the field-magnet coils through a suitable commutator for rendering the currents continuous in direction, and it supplies the current necessary to excite the field-magnet. The terminals of the other armature are connected through a supplemental coil applied with a suitable commutator or with collecting-rings, according to the character of the current required. The currents delivered to the work-circuit are derived from this second armature, and are either continuous or alternating in direction, as may be required, and accordingly as they are delivered through a commutator or collecting-rings in a manner well understood.

For convenience of description the first-named armature will be referred to herein as the "field-circuit" armature and the second as the "work-circuit" armature. The field-circuit armature is constructed in the form of a Gramme ring in so far as the coils employed for exciting the field-magnet are concerned; but the core of this armature is constructed with a bridge connecting different points in the core. These points are usually diametrically opposite each other. The supplemental coils are wound upon this bridge-piece. Lines of magnetic force developed by the field-exciting coils find their path through the field-magnet and armature in the usual manner. The lines of force developed by currents traversing the supplemental coils of the field-circuit armature find a magnetic path through the armature-core itself independently of the field-magnets. Now it is evident that an effect may be produced upon the resultant lines of force cut by the coils of the armature by varying the current traversing the supplemental coils, from which it results that a certain definite effect may be produced by variations in current flowing to the work-circuit. The manner in which this resultant effect is availed of will be more fully described in connection with the accompanying drawings, in which—

Figure 2:
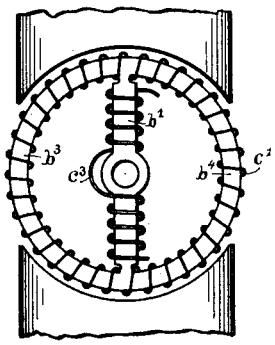
Figure 3:
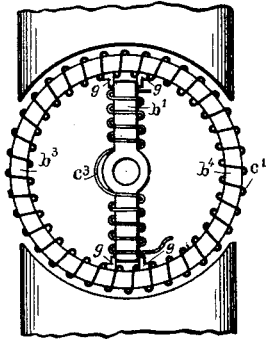

Figure 1 is a diagram showing, partly in section, a side elevation of such portions of a generator as are required to illustrate the invention, and Fig. 2 is an end view of the field-circuit armature. Fig. 3 illustrates a modification in the construction of the field-circuit armature.

Referring to the figures, A represents the field-magnet for establishing the field of force for two armatures B' and B², which are carried upon a shaft B. The armature B' revolves in a field of force $n\ s$. It is wound with coils $c'$, in which currents are generated for exciting the field-magnet. For this purpose the coils $c'$ may be connected with the commutator $d$ in any convenient well-understood manner for rendering the currents generated therein continuous in direction. The brushes $d'$ and $d^2$ are connected with the terminals of the field-magnet coils $a$. The armature B' may be of the type known as the "Gramme ring," or other suitable well-known construction may be adopted, provided it is adapted to be employed in the manner herein described. The second armature B² revolves in the field N S. It may be of any suitable well-known character. That here shown consists of a so-called "drum-armature," wound with coils $c^2$. The current required for supplying a work-circuit, to which the conductors L' and L² lead is derived from the armature B². For this purpose the terminals of the coils are connected with two contact-rings E' E², and the conductors L' L² are connected through suitable brushes $e'$ and $e^2$ with the respective contact-rings. A suitable commutator may replace the rings $e'\ e^2$ when currents continuous in direction are desired upon the work-circuit.

It is evident that unless further provision were made the field of force established by the field-magnet would remain approximately constant, whatever variations might occur in the current delivered to the work-circuit from the armature B². If now it is desired to cause the field of force to vary in some manner dependent upon the variation of current required by the work-circuit, an additional variable force is required. This is secured by means of a second winding $c^3$, applied to the armature B'. This winding $c^3$ is connected in series with the coils $c^2$ or receives a determinate proportion of the current delivered by the coils $c^2$. The coils $c^3$ are wound upon a bridge $b'$, constituting a portion of the core of an armature B'. This bridge connects two points diametrically opposite in the annular portion of the core B', and its position is so related to the winding and connections of the coil $c^2$ of the armature B² that the impulses generated by the revolution of the armature B² tend to establish lines of force through the cross-bar $b^2$, and thus through the two sides of the annular portion of the core of the armature B', when the latter armature is in certain definite determined positions with reference to the field-magnet. With each semi-revolution of the armature B', in the case of a two-pole machine, there is a reversal in the direction of the current or impulse transmitted from the coils $c^2$ through the coils $c^3$, so that the direction of polarization of the bridge $b'$ produced by such currents is always in the same direction in space, but reversed with reference to the bridge itself. The lines of polarization produced in the armature-core by reason of the coils $c^3$ find their path through the two opposite halves $b^3\ b^4$ of the armature-core without being compelled to traverse the field-magnet.

The principal effects produced by these lines of force are as follows: The coils $c'$ receive current primarily by reason of the lines of force which are established by the field-magnet and which they are caused to cut by the revolution of the armature. It is well known, however, that a current may also be produced by maintaining two coils, themselves stationary, and establishing lines of force through such coils. The lines of force established by currents traversing the coils $c^3$ do this, traverse the coils $c'$, and thus in turn tend to develop currents therein. The direction of the currents thus developed with reference to those originally established by reason of the coils cutting the lines of force established by the field-magnets may be determined by the relative positions of the armature B² and the bridge $b'$. If it is desired to cause the current developed in the field-magnet coils to increase with an increase of current upon the work-circuit, then the positions are such as to cause the lines of force developed by the currents traversing the coils $c^3$ to aid in effect the lines of force established by the field-magnet in developing currents in the coils $c'$. By reversing the relative windings of the coil $b'$ this effect may be reversed, and any intermediate effect may be obtained by relative changes in the positions of the two armatures, as is evident. It should be noticed, however, that the resultant current produced is not due alone to the two causes mentioned, but a third effect must be considered—namely, that produced in the coils $c^3$ themselves by their change of position with reference to the field of force $n\ s$—for it is evident that an electro-motive force will be developed in those coils by reason of their being caused to cut the lines of force of this field. The value of this electro-motive force is dependent both upon the proximity to the field-magnet and the number of convolutions in the coil $c^3$, and it may be made to assist or detract from the current normally developed in the coil $c'$, as required.

The construction of the armature B' and its core may be variously modified, as found convenient. Thus in Figs. 1 and 2 it is shown as having its ends in actual magnetic contact with the annular portion of the armature, but cut away slightly. It may, however, be entirely separate from the annular portion, as shown in Fig. 3, or it may not be cut away. In case it is entirely separated, as shown in Fig. 3, then it may be held in place by braces $g$, of brass or other non-magnetic material. In practice, however, it is usually desirable that it should be in magnetic contact, and that its cross-section should not be sufficiently great to allow too free a path for the lines of force developed by the field-magnet, for otherwise it would detract to too great an extent from the lines of force traversing the annular portion of the armature.

By varying the position of the bridge $b'$ and the relative position of the armature $B^2$ and the amount of iron in the bridge $b'$ and the winding of the same numerous different resultant effects may be produced upon the current delivered by the machine, all of which, however, follow from the organization which has been described and will be evident to those skilled in the art without more detailed explanation.

I do not herein claim an electric generator in which both sets of armature-coils are wound upon one and the same core.

I claim as my invention—

1. The combination, with a field-magnet, of an armature revolving in the field of force established thereby, a second armature, coils for establishing a field of force therefor, receiving currents from the first-named armature, a magnetic bridge-piece between points of opposite polarity in the core of the first-named armature, and supplemental coils wound upon said bridge-piece.

2. The combination, with the field-magnet and two armatures revolving within the field of force established thereby, of a commutator through which currents are delivered from one armature to the coils of the field-magnet for exciting the same, a bridge-piece applied to the first-named armature, having its poles directed to points of normally-opposite polarity in the armature-core, supplemental coils wound thereon and connected in series with the coils of the second armature, and a commutator or collector constituting the terminals of the coils of the second armature.

3. An armature for electric machines, consisting of an annular core, a bridge-piece directed to points diametrically opposite in said core, main exciting-coils upon the annular portion of said core, and supplemental coils wound upon the bridge-piece, substantially as described.

4. An armature for electric machines, consisting of an annular core, a bridge-piece directed to points diametrically opposite in said core, main exciting-coils upon the annular portion of said core and supplemental coils wound upon the bridge-piece, a field-magnet excited by currents delivered from the first-named coils, and an independent source of current for the second-named coils.

5. An armature for electric machines, consisting of an annular core, a bridge-piece directed to points diametrically opposite in said core, said bridge-piece being narrowed at its ends and in magnetic contact with the annular core, main exciting-coils upon the annular portion of said core, and supplemental coils wound upon the bridge-piece, substantially as described.

In testimony whereof I have hereunto subscribed my name this 12th day of February, A. D. 1889.

OLIVER B. SHALLENBERGER.

Witnesses:
CHARLES A. TERRY,
W. D. UPDEGRAFF.